US012769947B2

(12) United States Patent
Schindler et al.

(10) Patent No.: US 12,769,947 B2
(45) Date of Patent: Oct. 20, 2026

(54) TEXTUAL INFORMATION REFINING

(71) Applicant: Sentence Data Refinery Inc., Plymouth, MN (US)

(72) Inventors: Rock J. Schindler, Plymouth, MN (US); Dean H. Nelson, Holliday, UT (US)

( * ) Notice: Subject to any disclaimer, the term of this patent is extended or adjusted under 35 U.S.C. 154(b) by 128 days.

(21) Appl. No.: 18/785,073

(22) Filed: Jul. 26, 2024

(65) Prior Publication Data

US 2025/0053742 A1 Feb. 13, 2025

Related U.S. Application Data

(60) Provisional application No. 63/531,767, filed on Aug. 9, 2023.

(51) Int. Cl.
*G06F 40/284* (2020.01)
*G06F 16/383* (2019.01)

(52) U.S. Cl.
CPC .......... *G06F 40/284* (2020.01); *G06F 16/383* (2019.01)

(58) Field of Classification Search
CPC ....... G06F 40/284; G06F 16/383; G06F 40/30
See application file for complete search history.

(56) References Cited

U.S. PATENT DOCUMENTS

| | | | | |
|---|---|---|---|---|
| 11,593,433 | B2 * | 2/2023 | Rajendran | G06N 20/00 |
| 2017/0154029 | A1 * | 6/2017 | Kane | G06F 40/30 |
| 2019/0213409 | A1 * | 7/2019 | Tsuda | G06T 7/75 |
| 2024/0028626 | A1 * | 1/2024 | Sakamoto | G06F 18/24143 |
| 2024/0296284 | A1 * | 9/2024 | Shahgoshtasbi | G06F 40/284 |

* cited by examiner

*Primary Examiner* — Abul K Azad
(74) *Attorney, Agent, or Firm* — Edlavitch Law PLLC

(57) ABSTRACT

Methods are described herein for using or refining textual information from textual information sources (such as stored documentation or databases) to generate evaluative information. The methods can include preprocessing the information to remove or change abnormal characters and data anomalies in the information. They can also include extracting tokens from the preprocessed information as well normalizing the tokens and associating metadata with the tokens. The methods can also include updating the preprocessed information to be organized as a unique collection of sentences using the tokens. The methods can also include tagging items within the updated information such as tagging tokens, phrases, punctuation, and sentences. The methods can also include extracting targeted pieces of information from the tagged items. The methods can also include generating evaluative information according to the extracted pieces of information and an evaluation task. The evaluative information can include milestones, measurements, or metrics.

20 Claims, 9 Drawing Sheets

TEXTUAL INFORMATION REFINING

CROSS-REFERENCE TO RELATED APPLICATIONS

The present application claims the benefit of priority from U.S. Provisional Patent Application No. 63/531,767, filed on Aug. 9, 2023, and entitled "SENTENCE DATA REFINING FOR APPLIED CLAIMS TECHNOLOGY AI", the entire disclosure of which application is hereby incorporated herein by reference.

TECHNICAL FIELD

The present disclosure relates to textual information refining and processing, generally, and sentence data processing and refinement, specifically in some examples.

BACKGROUND

Businesses such as insurance and healthcare companies generate enormous amounts of written data as documentation of facts, circumstances, and decisions. Such sentence data contains a wealth of knowledge about business processes that are working or failing. Businesses lack the ability to harvest this knowledge efficiently and effectively.

Businesses will take a sample of records, manually read sentence data, and then extrapolate results to draw a conclusion about the functioning of a business process. Such a process is both highly ineffective and grossly inadequate. More recently, some technologies have emerged that are effective at identifying themes, patterns, and trends within sentence data. Those technologies lack granularity and are unable to discern the context of information.

SUMMARY

Disclosed herein are technologies (including computing systems and methods thereof) for textual information refining and processing and sentence data processing and refinement, specifically in some examples. The computing systems, methods, and technologies disclosed herein can also provide specific technical solutions to at least overcome the technical problems mentioned in the background section and other parts of the application as well as other technical problems not described herein but recognized by those skilled in the art, such as technical solutions to overcome technical problems in textual information refinement and processing and sentence data processing and refinement.

With respect to some embodiments, disclosed herein are computerized methods for textual information refining and processing and sentence data processing and refinement specifically in some examples, as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for textual information refining and processing and sentence data processing and refinement, specifically in some examples.

With respect to some embodiments, a system is provided that includes at least one computing device configured to perform textual information refining and processing and sentence data processing and refinement, specifically in some examples. And, with respect to some embodiments, a corresponding method is provided to be performed by at least one computing device. In some example embodiments, computer program code can be executed by at least one processor of one or more computing devices to implement functionality in accordance with at least some embodiments disclosed herein; and the computer program code being at least a part of or stored in a non-transitory computer-readable medium.

Specifically, in some embodiments, a method is included for textual information refining and processing and sentence data processing and refinement, specifically in some examples. The method includes receiving or retrieving, by preprocessing instructions of a computing system, original textual information from one or more textual information sources as well as preprocessing, by the preprocessing instructions, the original textual information to remove or change abnormal characters and data anomalies in the original textual information. In some examples, the textual information sources include stored documentation, databases, or a combination thereof. In some examples, the textual information is from one or more records, is part of a record, or is part of a file. In some cases, for example, the textual information includes insurance information. In some examples, the textual information includes healthcare information.

The method also can include extracting, by data refining instructions of the computing system, tokens from the preprocessed textual information as well as updating, by the data refining instructions, the preprocessed textual information to be organized as a collection of sentences using the tokens. In some examples, the preprocessing processes the information such that the preprocessed information includes queryable information. In some of such examples, at least part of the extraction of the tokens occurs via queries on the queryable information.

The method can also include tagging, by the data refining instructions, the updated textual information which includes tagging items of the updated textual information such as tagging tokens, phrases, punctuation, and sentences of the updated textual information. In some examples, at least part of the tagging occurs via queries of queryable information within the updated textual information. In some cases, the tagging includes associating metadata with the tagged items.

Also, the method can include extracting, by the data refining instructions, targeted pieces of information from the tagged textual information according to a predetermined extraction task. In some examples, at least part of the extraction of the targeted pieces of information occurs via queries of queryable information within the tagged textual information. In some cases, the extraction includes identifying the targeted pieces of information. In some examples, the extraction includes normalizing the targeted pieces of information.

Further, the method can include generating, by the data refining instructions, evaluative information according to the extracted pieces of information and an evaluation task. In some examples, the evaluation task includes organizing, analyzing, and aggregating the extracted pieces of information. Also, in some cases, the evaluative information includes milestones, measurements, or metrics related to the extracted pieces of information.

In some examples, the method further includes normalizing, by the data refining instructions, the tokens prior to the updating of the preprocessed textual information. The method can also include associating, by the data refining instructions, metadata with the tokens after the normalizing of the tokens.

In some examples, the method further includes secondary refining, by secondary data refining instructions of the computing system, the targeted pieces of information to organize, analyze, and aggregate the targeted pieces of information into information that is consumable to an end user according to predetermined production instructions.

In some examples, the tokens include words, acronyms, and abbreviations. In some examples, the method further includes normalizing, by the data refining instructions, the tokens, which includes performing a series of knowledge engineering tasks. In some cases, the series of knowledge engineering tasks includes resolving ambiguous tokens. In some examples, the series of knowledge engineering tasks includes performing a series of knowledge engineering tasks that include correcting misspelled words, resolving acronyms, and resolving abbreviations. In some cases, the series of knowledge engineering tasks includes creating permanent phrases including groups of tokens. In some examples, the method further includes storing, by the data refining instructions, outputs of the knowledge engineering tasks in a knowledge library accessible to provide guidance to future knowledge engineering tasks.

These and other important aspects of the invention are described more fully in the detailed description below. The invention is not limited to the particular assemblies, apparatuses, methods, and systems disclosed herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various example embodiments of the disclosure.

DETAILED DESCRIPTION

Figure 1:
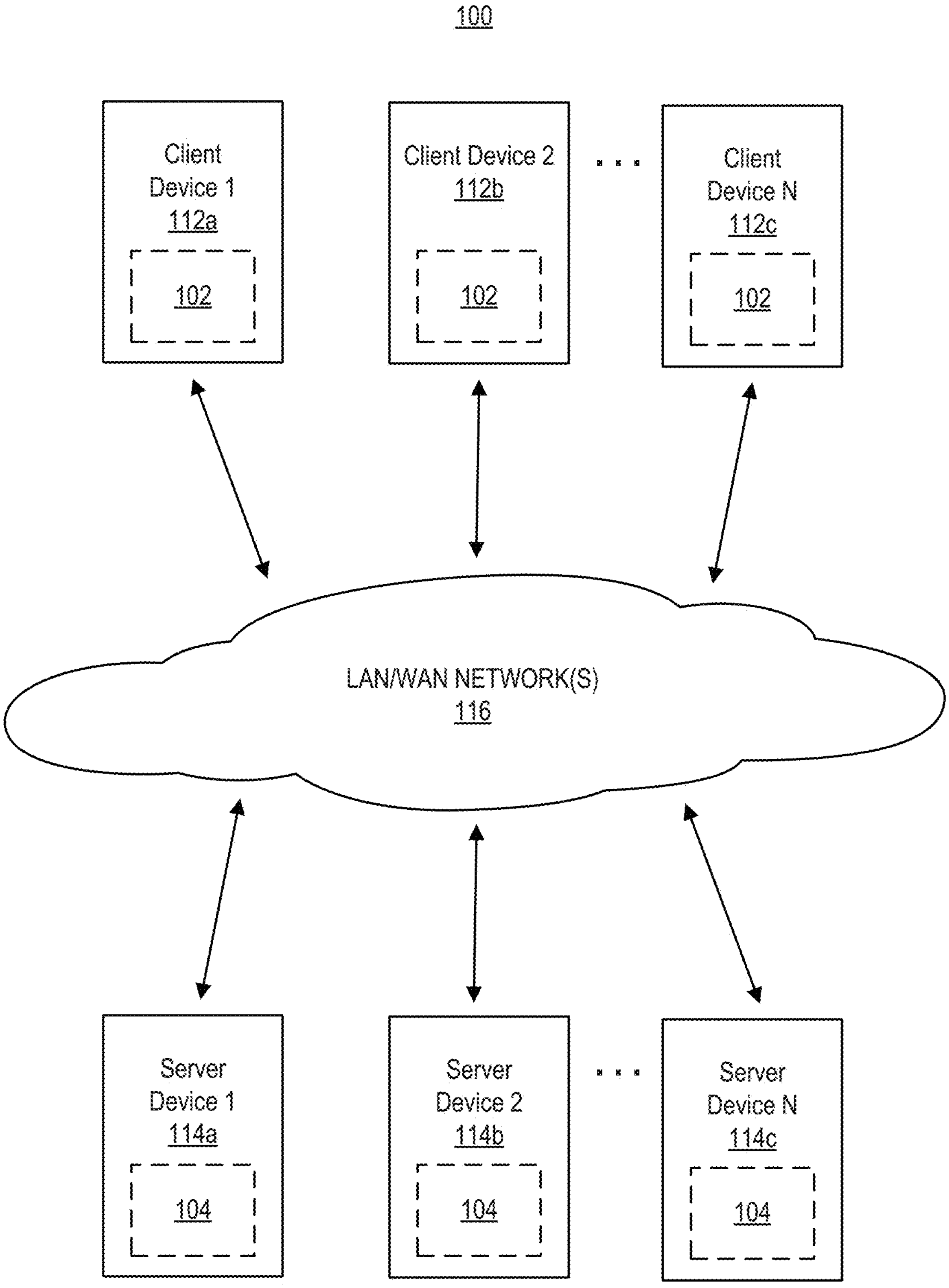
FIG. 1 illustrates an example computer network to implement technologies disclosed herein, in accordance with some embodiments of the present disclosure.

The present disclosure will be understood more fully from the detailed description given below and from the accompanying drawings of various example embodiments of the disclosure.

In general, disclosed herein are technologies (including computing systems and methods thereof) for textual information refining and processing. In some examples, the technologies can be for sentence data processing and refinement specifically. The computing systems, methods, and technologies disclosed herein can also provide specific technical solutions to at least overcome the technical problems mentioned in the background section and other parts of the application as well as other technical problems not described herein but recognized by those skilled in the art, such as technical solutions to overcome technical problems in textual information refinement and processing and sentence data processing and refinement.

The technologies described herein can refine original content documentation of facts, circumstances, and decisions created by businesses. The technologies can also transform the refined information or documentation into milestones, measurements, and metrics of operational activities. Original content documentation represents information entered manually, captured electronically, and stored as data. The data stored can include sentence data that includes parts of sentences as well as information associated with the parts and the sentences. The technologies can also identify and extract milestones and other data and information from sentence data which can provide a basis for measurements and metrics provided by some of the technologies. In some examples, a requirement for identifying a milestone is discerning the context of events and activities within sentences or the sentence data, which can include distinguishing events that happened, did not happen, or might happen. For example, some embodiments can determine context and identify milestone events from sentence data. In some embodiments, the technologies can replace the random selection and reading of records and provide a systematic approach to selection and review of records and additionally provide measurements of activities within records of an organization, such as an insurance provider or healthcare system.

In some embodiments, described herein are systems and methods for textual information refining and processing and sentence data processing and refinement. As shown in the drawings and corresponding text, embodiments can include processed information such as processed insurance information. However, it is to be understood that the information can alternatively include healthcare information or information from another industry that uses large amounts of written data as documentation for example. It is also to be understood that written data herein can include digitized data or information. Such digitized data or information can include data or information that is initially digitized after a user enters the information through a user interface or that is captured via a character recognition system or optical character recognition (OCR) system which converts scanned documents or images into machine-readable text.

FIG. 1 illustrates an example computer network 100 to implement technologies disclosed herein, in accordance with some embodiments of the present disclosure. Some of the computing systems disclosed herein as well as the network 100 include a system frontend 102 and a system backend 104. The computer network 100 can implement any of the methods, operations, modules, engines, or other types of components of the systems disclosed herein, such as via the frontend 102 or the backend 104. The computer network 100 is shown including client devices (e.g., see client devices 112*a*, 112*b*, and 112*c*). As shown, the system frontend 102 can be hosted and executed on the client devices of the computer network 100. The computer network 100 is also shown including server devices (e.g., see server devices 114*a*, 114*b*, and 114*c*). As shown, the system backend 104 can be hosted and executed on the server devices of the computer network 100.

The frontend 102 and backend 104 can include computer software code that can be executed in many different information technology environments. The frontend 102 and backend 104 or another part of the technologies described herein can include a code generator (also described herein as "the snipper"). The snipper can provide two functions. It can generate executable artifacts by compiling, such as in a selected sequence, inputs derived from textual information such as original content documentation, in some examples. Or, it can generate executable artifacts by compiling, such as in a selected sequence, inputs derived from multiple sources, including an array of previously developed software programs needing further instructions, knowledge bases of instructions, taxonomies with classification information, and user-defined parameters and specifications, in some examples. And, the snipper can also recursively resolve parameter variables from the textual information that are constructed of multiple levels of parameter variables. The parameter variable resolution can go several layers deep. Also, the snipper can use end-user instructions and generate machine-readable instructions according to the end-user instructions and instructions provided by the computing system that can include the frontend 102 and the backend 104.

In some embodiments, the system frontend 102, or at least user interfaces of the front end, can be created and implemented through custom-created components or implemented through components of known libraries. In such embodiments and others, the system backend 104 can use or be configured for a cross-platform runtime environment that can run on various operating systems (such as Windows, Linux, Unix, macOS, etc.). For managing data used by the network 100, a relational database management system (RDBMS) can be used that interacts with the system frontend 102 and the system backend 104, e.g., see RDBMS sub-instructions 310 of system 200 shown in FIG. 3. In some embodiments, the RDBMS can be utilized via SQL and computer programming languages that can interact with SQL.

The frontend 102 or the backend 104 can be utilized via a user interface (UI). The UI or any other UI described herein can include a user interface device that includes the user interactive aspects of a computer system (such as a graphical user interface or GUI). A UI described herein includes one or more layers, including a human-machine interface (HMI) that interfaces machines with physical input hardware. In some embodiments, such a UI also includes a device that implements an HMI—also known as a human interface device (HID). In some examples, UI described herein include tactile UI (touch), visual UI (sight), auditory UI (sound), etc. In some embodiments, a graphical user interface (GUI), which is composed of at least a visual UI capable of displaying graphics, or any other type of UI presents information to a user of the network 100 or a user using any one of the systems and methods described herein for textual information refining and processing.

Also, the computer network 100 is shown including one or more LAN/WAN networks 116 which is shown communicatively coupling the server devices hosting the system backend 104 and the client devices hosting the system frontend 102. The LAN/WAN network(s) 116 can include one or more local area networks (LAN(s)) or one or more wide area networks (WAN(s)). The LAN/WAN network(s) 116 can include the Internet or any other type of interconnected communications network. The LAN/WAN network(s) 116 can also include a single computer network or a telecommunications network. More specifically, the LAN/WAN network(s) 116 can include a local area network (LAN) such as a private computer network that connects computers in small physical areas, a wide area network (WAN) to connect computers located in different geographical locations, or a metropolitan area network (MAN)—also known as a middle area network—to connect computers in a geographic area larger than that covered by a large LAN but smaller than the area covered by a WAN.

At least each shown component of the computer network 100 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

As mentioned, with respect to some embodiments, disclosed herein are computerized methods for textual information refining and processing and sentence data processing and refinement specifically in some examples, as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for textual information refining and processing and sentence data processing and refinement, specifically in some examples.

With respect to some embodiments, a system is provided that includes at least one computing device configured to perform textual information refining and processing and sentence data processing and refinement, specifically in some examples. And, with respect to some embodiments, a corresponding method is provided to be performed by at least one computing device. In some example embodiments, computer program code can be executed by at least one processor of one or more computing devices to implement functionality in accordance with at least some embodiments disclosed herein; and the computer program code being at least a part of or stored in a non-transitory computer-readable medium.

Figure 2:
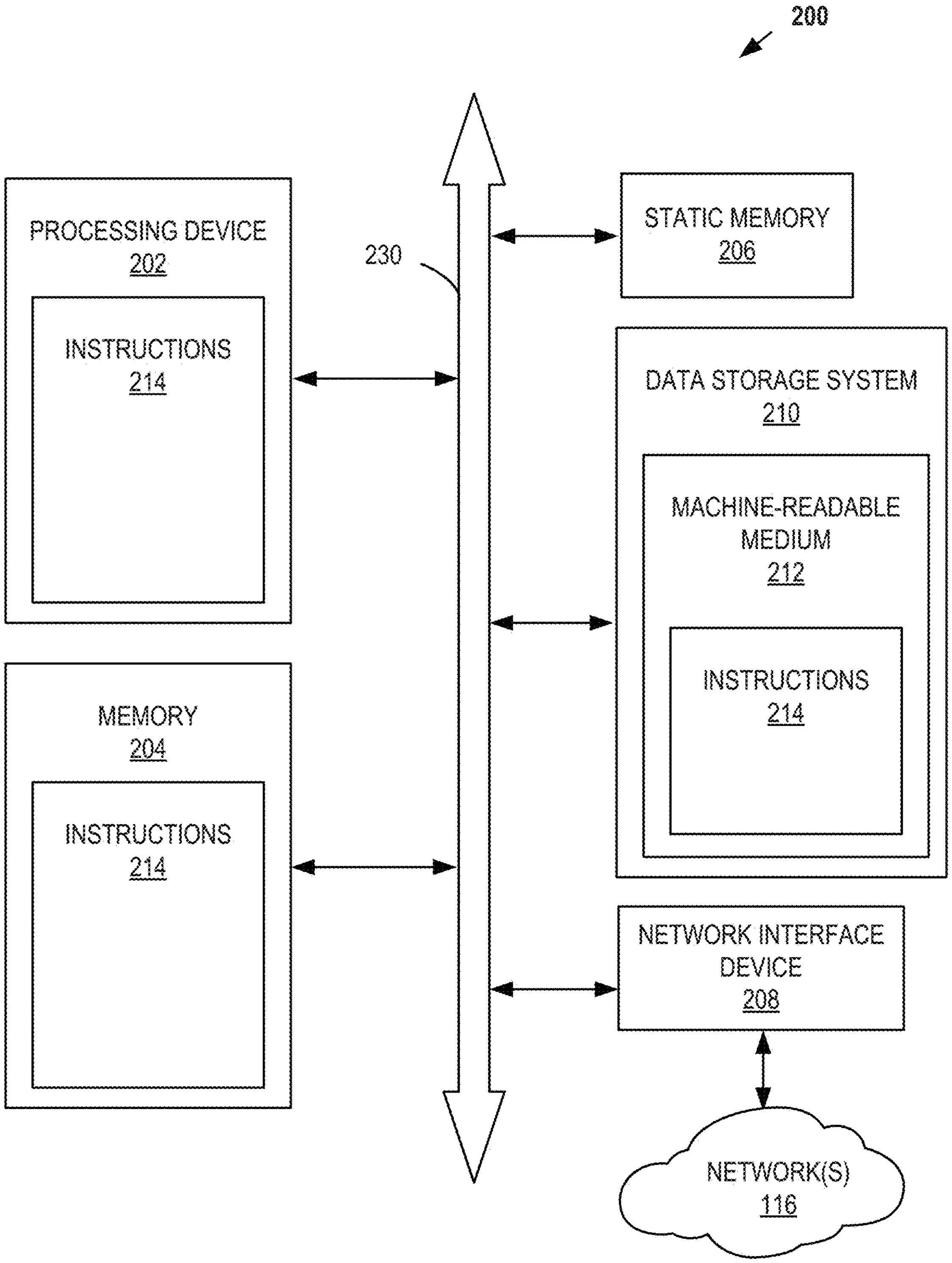
FIG. 2 illustrates a block diagram of example aspects of an example computing system, in accordance with some embodiments of the present disclosure.

FIG. 2 illustrates a block diagram of example aspects of an example computing system 200, in accordance with some embodiments of the present disclosure. FIG. 2 illustrates parts of the computing system 200 within which a set of instructions, for causing a machine of the computing system 200 to perform any one or more of the methodologies discussed herein can be executed (such as any one or more of methods found in FIGS. 4 to 10). In some embodiments, the computing system 200 can correspond to a host system that includes, is coupled to, or utilizes memory or can be used to perform the operations of a controller (e.g., to execute an operating system to perform operations corresponding to any one of the client or server devices shown in FIG. 1). In alternative embodiments, the machine can be connected (e.g., networked) to other machines in a LAN, an intranet, an extranet, or the Internet. The machine can operate in the capacity of a server or a client machine in a client-server network environment, as a peer machine in a peer-to-peer (or distributed) network environment, or as a server or a client machine in a cloud computing infrastructure or environment. In some embodiments where a cloud computing infrastructure is used, the infrastructure utilizes an on-demand cloud computing platform and APIs, such as AWS.

The machine can be a personal computer (PC), a tablet PC, a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein (such as any one or more of methods or operations found in FIGS. 4 to 10).

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230. The processing device 202 represents one or more general-purpose processing devices such as a microprocessor, a central processing unit, or the like. More particularly, the processing device can be a microprocessor or a processor implementing other instruction sets, or processors implementing a combination of instruction sets. The processing device 202 can also be one or more special-purpose processing devices such as an application-specific integrated circuit (ASIC), a field programmable gate array (FPGA), a digital signal processor (DSP), a network processor, or the like. The processing device 202 is configured to execute instructions 214 for performing the operations discussed herein. The computing system 200 can further include a network interface device 208 to communicate over the LAN/WAN network(s) 116 of FIG. 1. The data storage system 210 can include a machine-readable storage medium 212 (also known as a computer-readable medium) on which is stored one or more sets of instructions 214 or software embodying any one or more of the methodologies or functions disclosed herein (such as any one or more of the methods or corresponding operations found in FIGS. 4 to 10). The instructions 214 can also reside, completely or at least partially, within the main memory 204 or within the processing device 202 during execution thereof by the computing system 200, the main memory 204 and the processing device 202 also constituting machine-readable storage media.

In some embodiments, the instructions 214 include instructions to implement functionality corresponding to the client devices and server devices shown in FIG. 1 (e.g., see system frontend 102 and system backend 104 shown in FIG. 1). While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, the instructions 214 include instructions to implement functionality corresponding to artificial intelligence (AI) or machine learning disclosed herein (which in some embodiments can enhance the computerized decision making and determinations described herein). For the purposes of this disclosure, artificial intelligence includes any form of intelligence implemented by a machine, such as a computing system (e.g., see computing system 200). In some embodiments, AI disclosed herein includes machine learning. In some embodiments, AI disclosed herein includes search and mathematical optimization, formal logic, artificial neural networks (ANNs), methods based on statistics or probability, or any combination thereof. In some embodiments, machine learning disclosed herein includes supervised learning or unsupervised learning.

Figure 3:
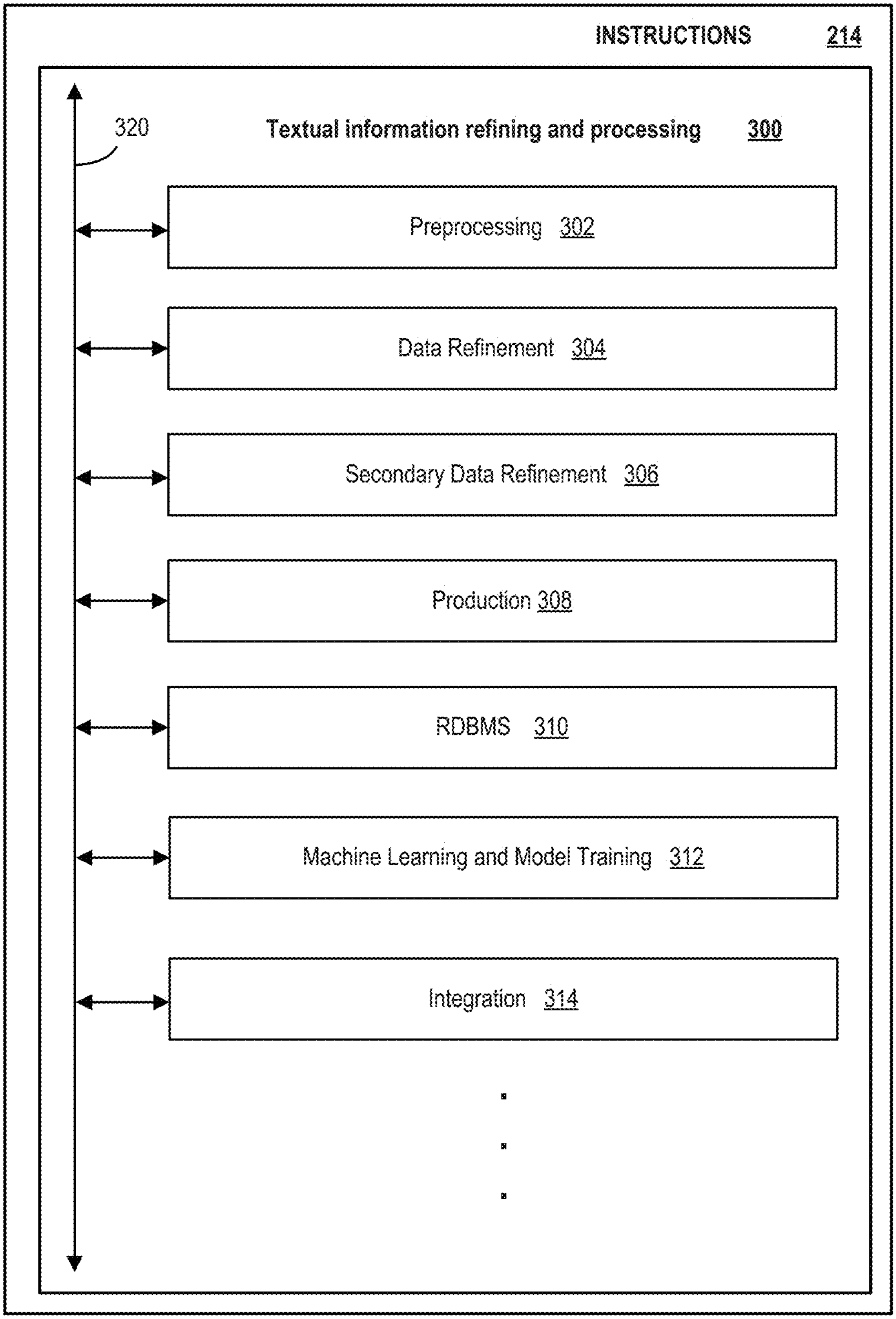
FIG. 3 illustrates example computer-executable instructions of the computing system of FIG. 2 that are configured to provide some of the steps of the methods described herein, in accordance with some embodiments of the present disclosure.

FIG. 3 illustrates example computer-executable instructions 214 and 300 that are configured to provide some of the operations and the steps of the methods described herein, in accordance with some embodiments of the present disclosure. As depicted, sub-instructions 300 are sub-instructions of instructions 214 and are configured to provide textual information refining and processing and sentence data processing and refinement, specifically in some examples. In other words, instructions 214 include sub-instructions 300 and also provide textual information refining and processing and sentence data processing and refinement, specifically in some examples. Also, as depicted, sub-instructions 302 to 314 are sub-instructions of sub-instructions 300. As a part of instructions 214, the processing device 202 is configured to execute sub-instructions 300 at its sub-instructions 302 to 326 for performing the operations discussed (e.g., see any one or more of the steps of methods 400 to 1000 or operations found in FIGS. 4 to 10). The sub-instructions 300 can reside, completely or at least partially, within the main memory 204 or within the processing device 202 during execution thereof by the computing system 200, the main memory 204, and the processing device 202 also constituting machine-readable storage media. And, in some embodiments, the sub-instructions 300 include instructions to implement functionality corresponding to the client devices and server devices shown in FIG. 1 (e.g., see system frontend 102 and system backend 104 shown in FIG. 1). As shown, the sub-instructions 300 include sub-instructions 302 to 314, which can interact with each other through a communications bus 320. The bus 320 can be implemented via computer hardware or software.

Sub-instructions 300 are configured to provide textual information refining and processing and sentence data processing and refinement, specifically in some examples. The sub-instructions 300 include preprocessing sub-instructions 302, data refinement sub-instructions 304, secondary data refinement sub-instructions 306, production sub-instructions 308, RDBMS sub-instructions 310, machine learning and model training sub-instructions 312, and integration sub-instructions 314 for example.

In some embodiments, one or more of the sub-instructions of sub-instructions 300 are configured to process and refine sentence data. The sub-instruction(s) of sub-instructions 300 that can contribute to the processing and refining of sentence data can include preprocessing sub-instructions 302. The preprocessing sub-instructions 302 can be configured to receive or retrieve entered or captured sentence data. The sentence data can include electronic characters entered through a UI or captured through a character recognition system such as an OCR system. The sentence data can be received or retrieved, by execution of the sub-instructions 302, from document files or a database via a DBMS and database queries. The preprocessing sub-instructions 302 can also be configured to preprocess the sentence data to remove or adjust obscure and rogue characters and data anomalies. The preprocessing sub-instructions 302 can also be configured to organize the sentence data, such as organizing the data based on its origin and preprocessing tasks that facilitate downstream data processing as well as sentence data refining.

Also, the sub-instruction(s) of sub-instructions 300 that can contribute to the processing and refining of sentence data can include data refinement sub-instructions 304. The data refinement sub-instructions 304 can be configured to perform many of the data processing tasks described herein, such as the data processing operations of method 400. For example, the sub-instruction 304 can be configured to provide functionality of a spacer. The spacer, via execution of the sub-instructions 304, separates punctuation from tokens (e.g., each token being or including one or more of words, acronyms, or abbreviations). Also, for example, the sub-instructions 304 can be configured to provide functionality of a substituter or corrector. The substituter, or corrector via execution of the sub-instructions 304, uses a dictionary or another type of knowledgebase to resolve or update misspelled words, acronyms, abbreviations, or other types of errors that can occur in the elements of sentences and sentence data. The sub-instructions 304 can also be configured to identify, normalize, and uniquely label tokens (such as date tokens, words, values, etc.) such as via known find and replace functionality.

Also, the sub-instructions 304, when executed, can be configured to perform a series of knowledge engineering tasks (or KE tasks). The KE tasks or knowledge engineering tasks can be integral to the correcting and updating of misspelled words, resolving acronyms, handling abbreviations, generating phrases, and resolving ambiguous tokens. Modules or sub-instructions of the KE tasks, or the sub-instructions 304, can include a tokenizer, an Ngrammer module, a KE broken module (which splits individual tokens), and a KE touching module (which corrects missing spacing issues in some cases). The knowledge gained during a KE task can be accumulated via sub-instructions 304 in a knowledge library and available for sentence data refining applications and operations.

The sub-instructions 304 can also be configured to perform tasks of a sentencer module (such as performing the tasks after one or more KE tasks). The sentencer module, which can be implemented via execution of sub-instructions 304, separates paragraphs and other parts of documentation and records into individual sentences. A record processed via the sentencer module can be one paragraph of textual information or it could be several pages of narrative documentation, for example.

The sub-instructions 304 can also be configured to tag tokens, phrases, and punctuation. The tagging can occur after the KE tasks or the tasks of the sentencer module, for example. The tagging can include a UI or environment that provides an interface for assigning certain types of tags to the tokens, phrases, and punctuation. The certain types of tags can include syntactical tags (such as tags relating to grammar), semantical tags, and thematical tags (such as tags relating to themes or categories of information). The generation of the tags can occur via execution of the sub-instructions 304 too. The semantical tags can be generated based on taxonomies for different industries (such as taxonomies for the insurance, healthcare, utilities, or transportation industry). The sub-instructions 304 can also be configured to use the assigned tags to target or identify pieces of the textual information and extract from each sentence or phrase according to an extractor. The extractor or at least its functionality can be implemented via execution of the sub-instructions 304. The extractor can find certain pieces of information and extract such information as well as format and normalize the extracted information.

Also, the sub-instruction(s) of sub-instructions 300 that can contribute to the processing and refining of sentence data can include secondary data refinement sub-instructions 306. The secondary data refinement sub-instructions 306 can be configured to perform many of the secondary refining or processing tasks described herein, such as the operations of method 600. The sub-instructions 306 can be configured to organize, analyze, and aggregate the extracted information (such as the information extracted via sub-instructions 304). The information can be organized, analyzed, and aggregated into information consumable for an end user. The sub-instructions 306 can be configured to provide functions and procedures to compare and select extractions within sentences, records, and documents. Also, the sub-instructions 306 can be configured to group extractions and provide routines to compare and measure extractions at a grouped level. The sub-instructions 306 can also be configured to processes to establish milestone events and activities, measure time passage between milestones, and calculate metrics from the measurements.

In some embodiments, the sub-instructions 304 or 306 can be configured to implement discernment of a context in a part of the textual information. For instance, the instructions can be configured to distinguish events and activities that happened, did not happen, or that may happen. An end user of the computing system may want to know when an event or activity happened, did not happen, or may happen. The computing system, such as via sub-instructions 304 or 306, can provide a user with control over such conditions and factors and that control can be used to identify or create milestones. In some cases, milestones can include an event that happened, an event that happened and an activity that may happen, an event that happened and another event that did not happen, or any other combination of events and activities. Also, the instructions can be configured to create milestone markers (such as markers selected by an end user) as well as measure time passage from one milestone to another, measure the frequency of milestones, establish expected values for a population in the textual information, measure variance of individual performance of elements in the textual information against expected values, or any combination thereof.

Referring back to the data refinement sub-instructions 304, some embodiments include tasks performed with a common architectural structure. Such a structure can include an array of specimen software programs created that have open parameter variables waiting to be defined. Also, such a structure can include intermediate programs that are populated with instructions for manipulating text that include such tasks as finding and replacing text strings, concatenating text strings, adding or removing spaces, removing unrecognizable characters, replacing certain characters in targeted locations with a uniquely recognizable character, joining individual tokens to form token phrases, extracting targeted text strings, labeling tokens and punctuation character with a symbol referred to as attributes in some cases, or any combination thereof. The structure can also include programs that are controlled by end users in which parameter variables are populated according to specific requirements of data being inputted and targeted output. The structure can also include knowledge bases that are created, populated, and stored based on content and intended application. The structure can also include taxonomies that are created, populated, and stored based on subject matter and intended application. The structure can also include various files with parameters, attributes, and specifications about tokens (such as where a token represents a group of text or numerical characters or some combination thereof). The structure can also include hardware and software components (e.g., see system frontend 102 and backend 104). The structure can also include the snipper. In some examples, the snipper can build executable artifacts by compiling in a sequence of inputs from specimen programs, intermediate programs, high-level programs, knowledgebases, taxonomies, files with parameters and specifications, or any combination thereof.

Also, referring back to the data refinement sub-instructions 304, the spacer uses stored instructions to determine where punctuation characters represent sentence breaks. For example, it can distinguish a period included as a decimal in a number, a break in an email, an honorific (e.g., "Dr."), or part of a website address versus the period representing the end of a sentence. The stored instructions can be applied at an individual token level where a token represents a group of text or numerical characters or some combination thereof. Tokens are evaluated line by line through a record and from one record to the next by the spacer for example. The functionality of the spacer can be defined by an end user, such as via the frontend 102 or a UI of the computing system. The spacer, such as along with the snipper, uses the end user's instructions along with other parameter value inputs and specimen programs to compile and execute artifacts that perform a requested task.

Also, referring back to the data refinement sub-instructions 304, the substituter (or corrector) includes an iterative process where an individual token or multiple tokens of a dataset are evaluated against existing knowledgebases to determine whether the individual token or multiple tokens should be modified or replaced. The iterative process can include a predetermined matching of the dataset to existing knowledge bases based on the subject matter content of the data being processed. The attributes of the individual token or the multiple tokens can be stored in one or more of the knowledgebases selected for a corpus of data. Also, the iterative process can be based on the number of tokens carried as variants in the knowledgebases and the attributes of the selected knowledge bases. In some examples, the substituter functions by the user defining the parameters in a high-level program. The substituter can then use the user's instructions along with other required parameter value inputs and specimen programs to compile and execute artifacts that perform a task.

Also, referring back to the data refinement sub-instructions 304, the KE tasks or knowledge engineering tasks can occur afterward or in parallel to the tasks provided by the spacer or the substituter. The spacer and the substituter can use existing knowledge of tokens, phrases, jargon, misspellings, and so forth, whereas the KE tasks can include identifying new or additional parts or functionality that is often beyond existing knowledge (e.g., new and unknown tokens, phrases, jargon, misspellings, etc. with respect to used knowledgebases). Such flexibility provided through KE tasks is useful for information targeted for extraction. An example goal of the KE tasks is to transform the subject sentence data from its original condition to a state whereby the ensuing tasks and embedded algorithms will be able to detect, extract, and manipulate the targeted information.

The tokenizer, which can be a part of the KE tasks and can be implemented via the sub-instructions 304, can identify tokens for which no attributes have previously been created and suggest possible attribute tags appropriate for the token. The tokenizer also can interact with the Ngrammer module to identify possible multiple token phrases. Both single and multiple token phrases can be evaluated, via the tokenizer and Ngrammer module, as phrase correction candidates of ambiguous tokens and be associated with, via the tokenizer and Ngrammer module, relevant taxonomies that are or will be used in the extraction of information. The Ngrammer module or task can use a process to assemble candidate phrases based on the patterns of tokens and the frequency thereof. In some examples, the Ngrammer interacts with the tokenizer, the KE broken module, and the KE touching module to assemble a KE task. In some embodiments, the KE broken module uses a process to identify tokens that were split either upon entry or by a system that stored the information. In some embodiments, the KE touching module uses a process to identify tokens that were entered with a missing space either upon entry or by a system that stored the information. In some cases, the KE tasks are completed by an end user defining the parameters in a high-level program. And, the tokenizer or KE tasks can use the user's instructions along with other parameter value inputs and specimen programs to compile and execute artifacts that perform a KE task.

Referring back to the data refinement sub-instructions 304, the sentencer can use subject sentence data that has been spaced and substituted to remove impurities and separate records into individual sentences. Each sentence can be given a unique ID by the sentencer relative to its position in a given record. The sentencer can also assign syntactical attribute tags to each token in a sentence. The assignment can utilize grammatical morphology processes. The sentencer can also implement some of the tagging, in some cases. It can provide tagging, with a unique attribute tag, to punctuation, including parentheses, brackets, and special characters. It can also provide the syntactical attribute tags for tokens that can be generated according to used knowledgebases that are selected and tiered for a corpus of data. In some examples, the sentencer provides its functionality according to end-user input including parameters in a high-level program. The sentencer can use the user's instructions along with other parameter value inputs and specimen programs to compile and execute artifacts that perform such tasks.

Also, referring back to the data refinement sub-instructions 304, the tagging or a tagger, implemented via the sub-instructions 304, can retrieve semantical tags from a tiered list of taxonomies that are uniquely created for a configured output. When the tagging or tagger pulls information from taxonomies, it creates a single dynamic taxonomy that is relevant to the immediate needs of the end user and the output for the application using the tagging. In some embodiments, a feature of the tagging is a protocol for establishing the strength of semantic categories which allows users to more efficiently and effectively use a category to accomplish a defined purpose. In some cases, the tagging applies the semantic tags to relevant tokens in the subject data and builds the necessary relationships and tables for the tags to be used in the extraction of the textual information. An end user can define the parameters for the tagger in a high-level program. The tagger can use the user's instructions along with other parameter value inputs and specimen programs to compile and execute artifacts that perform such tasks.

Also, referring back to the data refinement sub-instructions 304, the extractions can include identifying, extracting, and manipulating targeted information for a sentence in a population of subject data. The extractions can include an interface for creation of the user instructions and the execution of the user instructions. The creation of user instructions can be according to the snipper or corresponding tasks its processes to resolve parameter variables. In some examples, a parameter variable is a defined sequence of three-character tags. In some cases, the snipper can resolve parameter variables constructed of multiple levels of parameter variables. This means users can write one parameter variable that defines multiple parameter variables which also defines the multiple parameter variables. For example, one user instruction can contain ten unique parameter variables in which each of the unique parameter variables calls multiple levels of parameter variables. This means a user can create thousands of instructions, via the system, which consider myriads of possible scenarios encountered in the subject data for the information targeted for extraction. User instructions can also be generated in a concise way through normalization processes of the system. In addition to parameter variable resolution capability, the extractions or the snipper can control how tokens in each sentence are identified using alternative types of character tagging systems (such as a three-character tagging system). Such features can also include a function that controls the processing of the remnants of a sentence after a targeted piece of information has been extracted from a sentence, respectively. They can also include a function that provides the identification of the linguistical context of the target information. They can also include a function that controls the strength or weighting of the targeted information extracted. They can also include a function that controls the formatting and manipulation of targeted information.

In some embodiments, the system can use, via execution of sub-instructions 304, an array of user instructions and the inputs from specimen programs, intermediate programs, high-level programs, proprietary knowledge bases, and proprietary taxonomies such that the snipper or corresponding tasks create a series of executable artifacts. Such artifacts are programs that run in a sequence established by the snipper or corresponding tasks in order to gather inputs, execute other tasks sentence data refinement, and create requested output.

In some embodiments, the system can track and locate elements that either extracted incorrect target information or failed to extract target information. The system can implement such a feature via execution of the sub-instructions 304 too. The speed and efficiency of testing the efficacy of targeted information and incorporating the necessary configuration adjustments is made possible by the regimented protocol of the snipper and the compiled executable artifacts in some examples. The protocol can include giving each identified sentence its own unique ID as well as giving every token extracted according to a user instruction a unique extraction ID. And, each unique extraction ID can provide a token offset value (TOV) that identifies the relevance or irrelevance of the extracted information as targeted information. The TOV can provide an ordinal position of a piece of the extracted information relative to other pieces of the extracted information. The TOV can also be related to distinguishing extracted information as either qualifying for targeted information or disqualified as targeted information depending on a set threshold value for the TOV.

Referring back to the data refinement sub-instructions 304 and the secondary data refinement sub-instructions 306, after the targeted information has been extracted from individual sentences and is stored as uniquely identified extraction values, the target information can be used for identifying or determining milestones. The system, via sub-instructions 304 or 306, can organize, analyze, and aggregate targeted or extracted information to identify or determine milestones. The system can use the IDs and TOV information, via sub-instructions 304 or 306, for the organization, analysis, and aggregation processes. In some cases, because sentence data refining is performed at a sentence level, the system can assemble or discern extractions from multiple sentences for the purpose of drawing a conclusion about the existence or non-existence of a milestone. In some embodiments, for a given application of the system, there can be one or multiple procedures performed to compare extractions within sentences or records, look for milestones, normalize extractions based on selected taxonomies, and scrutinize related extractions for contradictions. In this part of the refining process, Snipper is used in the same way previously described herein.

In some embodiments, the aggregation of milestones, such as via the sub-instructions 306, is dependent upon the specific needs or uses of a given user. In a sentence data refining process, aggregation can include measuring time passage from one milestone to another, measuring the frequency of milestones, establishing expected values for a population, and measuring variances of individual performance against expected values. The aggregation also can include selecting a milestone from a pool of identical or near identical milestones (based on a comparison threshold) that can occur more than once in a pool of records. In that selection, a user is provided with functionality to determine the milestone. For example, a user can request the earliest milestone, the latest milestone, the frequency of milestones, or all of the milestones. Such functionality can be initiated by snipper as users' selections of milestone parameters can be in or linked to parameter variables entered with the snipper.

In some embodiments, the sentence data refining tasks (such as the tasks implemented via sub-instructions 304 and 306) can be run either as individual tasks at the control of an end user or the tasks can be run sequentially in an automated manner in a data processing pipeline where the processing is initiated either by an end user or by an automated signal created by an electronic monitoring system for example.

Also shown in FIG. 3 are production sub-instructions 308. The production sub-instructions 308 can be configured to enhance the secondary refining provided by the secondary data refining sub-instructions 306. In some embodiments, the computing system can further refine the targeted pieces of information to organize, analyze, and aggregate the targeted pieces of information into information that is consumable to an end user according to the production sub-instructions 308.

Also shown in FIG. 3 are relational database management system sub-instructions (i.e., RDBMS sub-instructions 310). The RDBMS sub-instructions 310 can be configured to manage data and information received and processed by the computing system 200 as well as manage data and information received and processed by a computing system of the network 100, depending on the embodiment. The RDBMS sub-instructions 310 can be configured to interact with the system frontend 102 and the system backend 104, for example. In some embodiments, an RDBMS, which can run according to RDBMS sub-instructions 310, can be utilized via SQL and computer programming languages that can interact with SQL. The RDBMS sub-instructions 310 can be configured to execute the SQL queries and computer programming languages that interact with SQL as well as related programs associated with data querying and storage described herein. In some cases, the RDBMS sub-instructions 310 can be configured to store the outputs of the knowledge engineering tasks, such as according to database queries or other types of instructions of a relational database management system.

Also shown in FIG. 3 are machine learning and model training sub-instructions 312. The machine learning and model training sub-instructions 312 can be configured to implement functionality corresponding to artificial intelligence (AI) or machine learning disclosed herein (which in some embodiments can enhance the computerized decision making and determinations described herein). For example, the sub-instructions 312, when executed, can be configured to perform the steps of method 1000 shown in FIG. 10.

Also shown in FIG. 3 are integration sub-instructions 314. In some embodiments, functionality of one or more of the aforesaid operations associated with sub-instructions 302 to 312 or functionality of one or more of the methods 400 to 1000 can be integrated by the sub-instructions 314 with online applications, sites, or pages (such as web applications, sites, or pages). The integration performed via execution of sub-instructions 314 can include using one or more user interfaces and application programming interfaces configured to integrate the computing system and its various features and instructions with online applications, sites, or pages. In some embodiments, the integration can include or be a part of a computer program for web applications or sites such as a program coded in CSS, HTML, JavaScript, or another type of web programming language. The integration can also include a reference to libraries or other code directly from the source code of a website or application. Also, the integration can include instructions that do not need to be translated into machine code before it runs.

Figure 4:
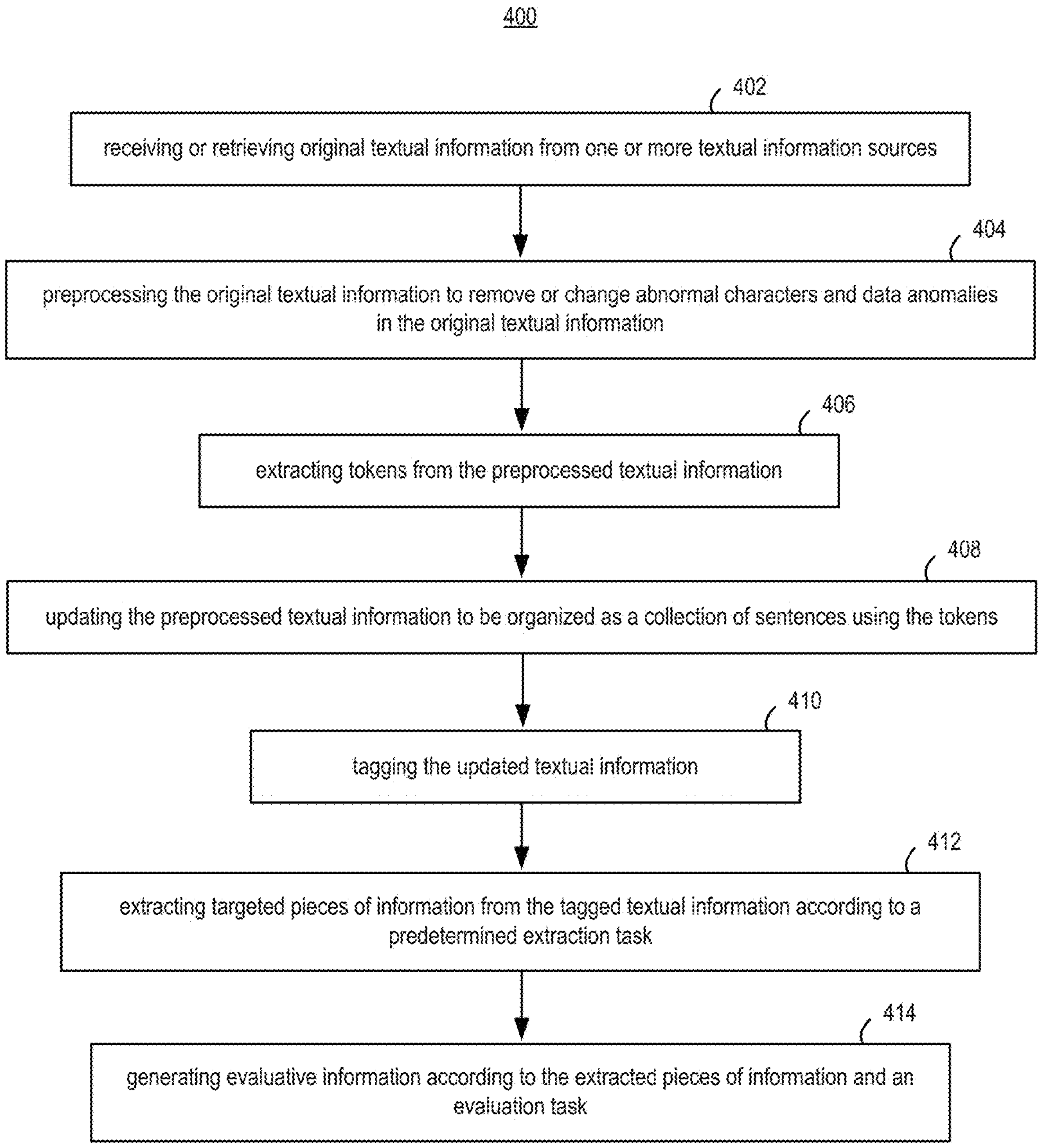
FIGS. 4 to 10 illustrate example methods of the technologies disclosed herein, in accordance with some embodiments of the present disclosure.

FIGS. 4 to 10 illustrate example methods of the technologies disclosed herein, in accordance with some embodiments of the present disclosure. In some examples, one or more of the methods can be combined with another one or more of the methods disclosed herein. FIG. 4 shows a method 400, implemented by a computing system (such as the computing system 200 shown in FIG. 2), for textual information refining and processing and sentence data processing and refinement, specifically in some examples. In some examples, method 400 can be combined with any one or more of the other methods disclosed herein.

The method 400 includes, at step 402, receiving or retrieving, by preprocessing instructions of a computing system (e.g., see preprocessing sub-instructions 302 of computing system 200 shown in FIG. 3), original textual information from one or more textual information sources. The method 400 also includes, at step 404, preprocessing, by the preprocessing instructions, the original textual information to remove or change abnormal characters and data anomalies in the original textual information. In some examples, the textual information sources include stored documentation, databases, or a combination thereof. In some examples, the textual information is from one or more records, is part of a record, or is part of a file. In some cases, for example, the textual information includes insurance information. And, in some cases, for example, the textual information includes healthcare information.

Also, the method 400, at step 406, includes extracting, by data refining instructions of the computing system (e.g., see data refinement sub-instructions 304 of computing system 200 shown in FIG. 3), tokens from the preprocessed textual information. The method 400 also includes, at step 408, updating, by the data refining instructions, the preprocessed textual information to be organized as a collection of sentences using the tokens. In some examples, the preprocessing processes the information such that the preprocessed information includes queryable information. In some of such examples, at least part of the extraction of the tokens occurs via queries on the queryable information.

The method 400, at step 410, also includes tagging, by the data refining instructions, the updated textual information which includes tagging items of the updated textual information such as tagging tokens, phrases, punctuation, and sentences of the updated textual information. In some examples, at least part of the tagging occurs via queries of queryable information within the updated textual information. In some cases, the tagging includes associating metadata with the tagged items.

Also, the method 400, at step 412, includes extracting, by the data refining instructions, targeted pieces of information from the tagged textual information according to a predetermined extraction task. In some examples, at least part of the extraction of the targeted pieces of information occurs via queries of queryable information within the tagged textual information. In some cases, the extraction includes identifying the targeted pieces of information. In some examples, the extraction includes normalizing the targeted pieces of information.

The method 400, at step 414, also includes generating, by the data refining instructions, evaluative information according to the extracted pieces of information and an evaluation task. In some examples, the evaluation task includes organizing, analyzing, and aggregating the extracted pieces of information. Also, in some cases, the evaluative information includes milestones, measurements, or metrics related to the extracted pieces of information.

Figure 5:
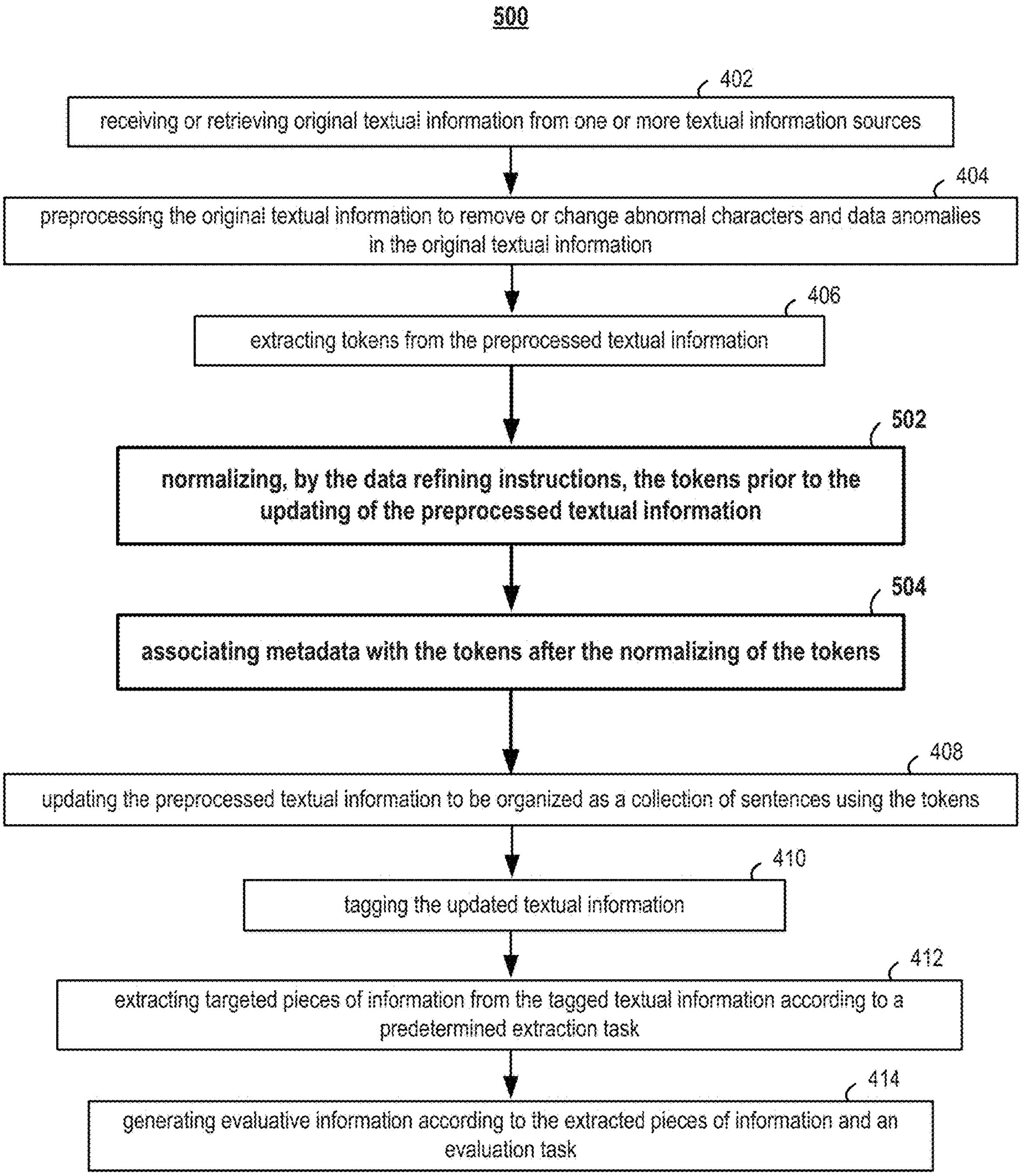

FIG. 5 shows another method, method 500, implemented by a computing system (such as the computing system 200), for textual information refining and processing and sentence data processing and refinement, specifically in some examples. As shown, method 500 includes the steps of method 400. Furthermore, method 500 includes, at step 502, normalizing, by the data refining instructions (e.g., see data refinement sub-instructions 304 of computing system 200 shown in FIG. 3), the tokens prior to the updating of the preprocessed textual information. The method 500 also includes, at step 504, associating, by the data refining instructions, metadata with the tokens after the normalizing of the tokens.

Figure 6:
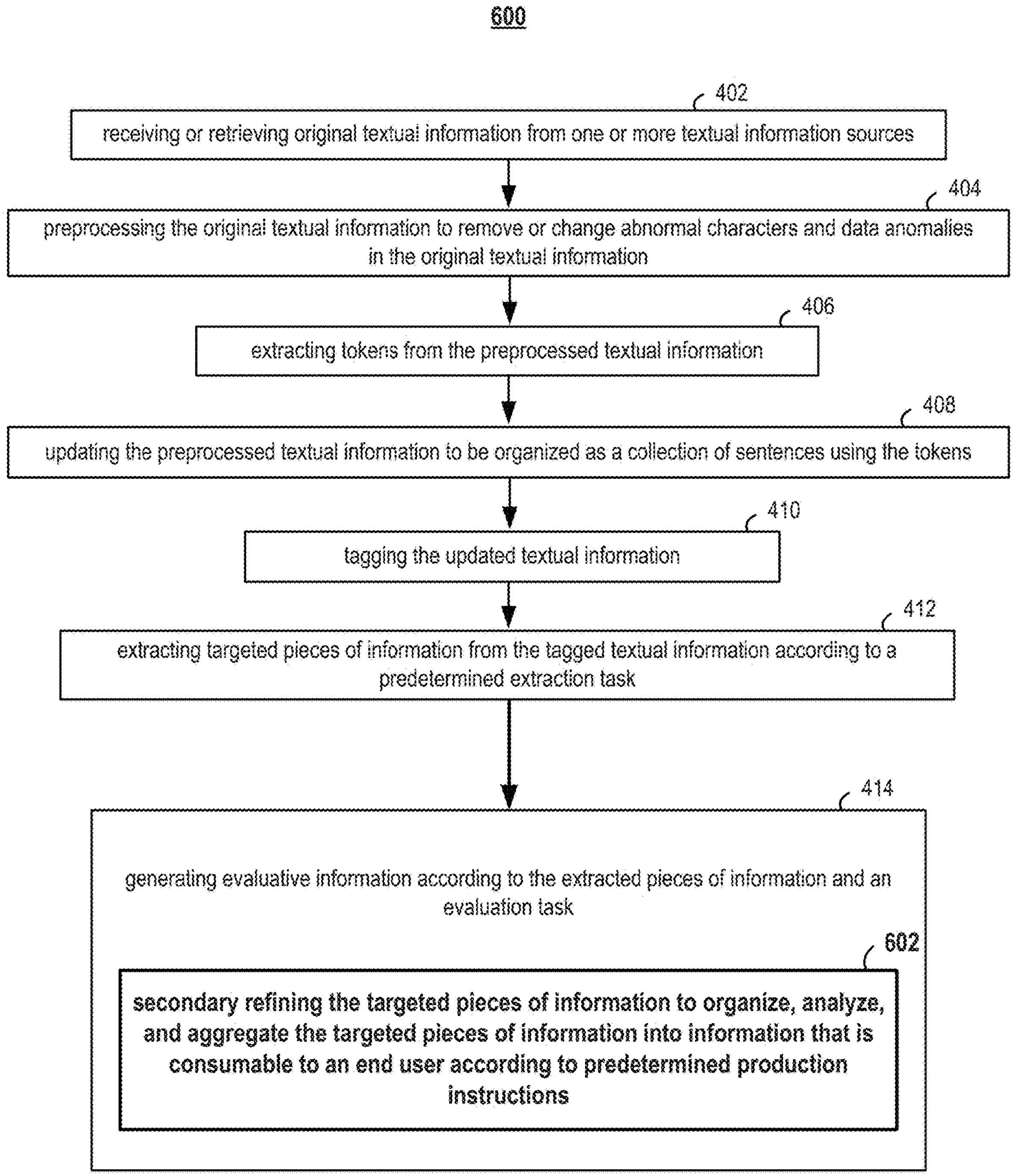

FIG. 6 shows another method, method 600, implemented by a computing system (such as the computing system 200), for textual information refining and processing and sentence data processing and refinement, specifically in some examples. As shown, method 600 includes the steps of method 400. Furthermore, method 600 includes, at step 602, secondary refining, by secondary data refining instructions of the computing system (e.g., see secondary data refinement sub-instructions 306 of computing system 200 shown in FIG. 3), the targeted pieces of information to organize, analyze, and aggregate the targeted pieces of information into information that is consumable to an end user according to predetermined production instructions (e.g., see production sub-instructions 308 shown in FIG. 3). As shown, step 602 is a part of step 414 of method 400 (which includes generating evaluative information according to the extracted pieces of information and an evaluation task); however, in some other examples, step 602 is independent or separate from step 414.

Figure 7:
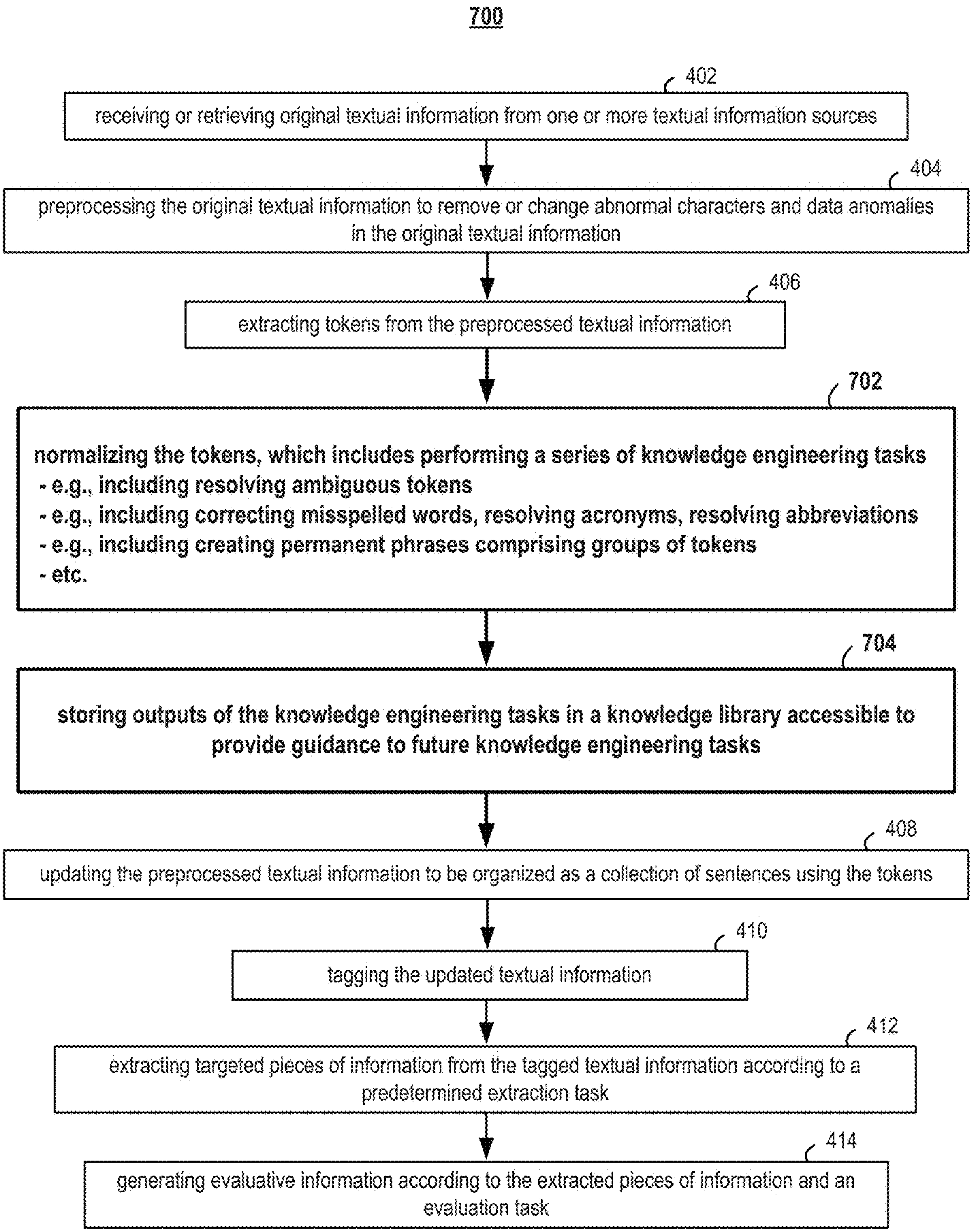

In some examples, the tokens described in methods 400 to 600 as well as other methods disclosed herein include words, acronyms, and abbreviations. In some of such examples, a method can further include normalizing, by data refining instructions (e.g., see data refinement sub-instructions 304 of computing system 200 shown in FIG. 3), the tokens, which can include performing a series of knowledge engineering tasks. FIG. 7 shows another method, method 700, implemented by a computing system (such as the computing system 200), for textual information refining and processing and sentence data processing and refinement specifically, in which tokens include words, acronyms, and abbreviations and normalizing the tokens includes performing a series of knowledge engineering tasks (e.g., see step 702 of method 700). In some cases, the series of knowledge engineering tasks includes resolving ambiguous tokens. In some examples, the series of knowledge engineering tasks includes performing a series of knowledge engineering tasks that include correcting misspelled words, resolving acronyms, and resolving abbreviations. In some cases, the series of knowledge engineering tasks includes creating permanent phrases including groups of tokens. Also, the method 700 further includes, at step 704, storing, by the data refining instructions, outputs of the knowledge engineering tasks in a knowledge library accessible to provide guidance to future knowledge engineering tasks. In some cases, the storing of the outputs of the knowledge engineering tasks is according to database queries or other types of instructions of a relational database management system (e.g., see RDBMS sub-instructions 310 shown in FIG. 3).

Figure 8:
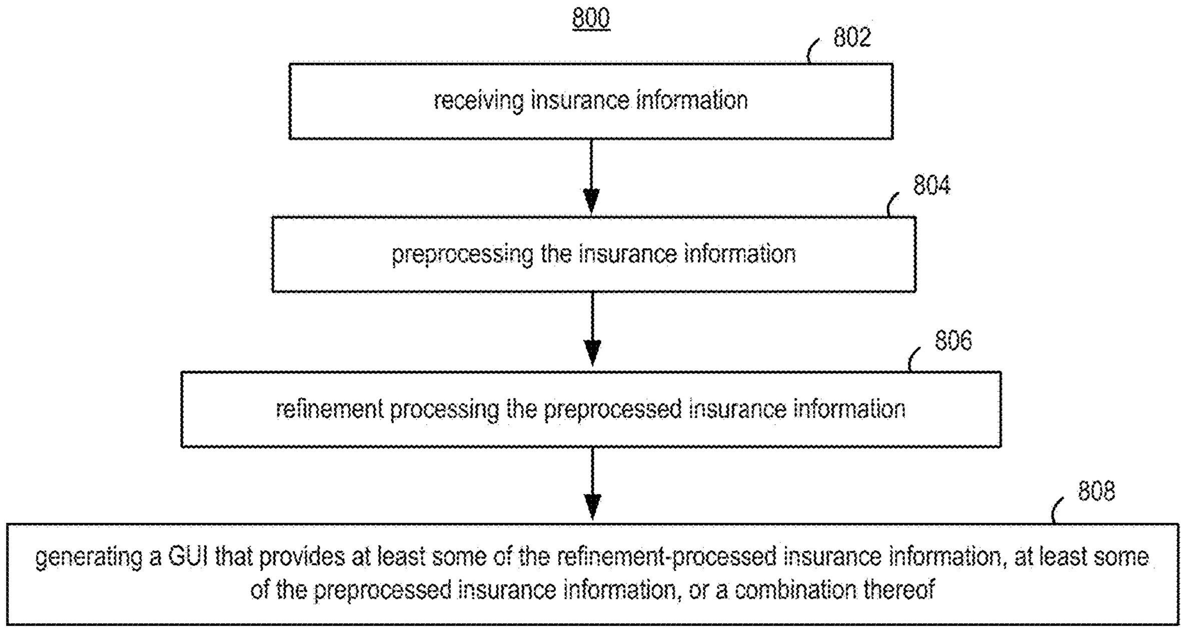

FIG. 8 shows another method, method 800, implemented by a computing system (such as the computing system 200), for textual information refining and processing and sentence data processing and refinement, specifically in some examples. As shown, in the method 800, the processed information is insurance information. However, it is to be understood that the information can alternatively include healthcare information or information from another industry that uses large amounts of written data as documentation. It is also to be understood that written data herein can include digitized data or information. Such digitized data or information can include data or information that is initially digitized after a user enters the information through a user interface or that is captured via a character recognition system or OCR system which converts scanned documents or images into machine-readable text.

The method 800, at step 802, commences with receiving, by the computing system, insurance information. At step 804, the method 800 continues with preprocessing, by the computing system, the insurance information. At step 806, the method includes refinement processing, by the computing system, the preprocessed insurance information. And, at step 808, the method includes generating, by the computing system, a graphical user interface (GUI) that provides at least some of the refinement-processed insurance information, at least some of the preprocessed insurance information, or a combination thereof. In some examples, method 800 can be combined with any one or more of the other methods disclosed herein such as method 400, 500, 600, or 700. In some examples, the insurance information includes daily decisions and interactions of adjusters captured in notes and narrative documentation. In some examples, the insurance information includes information associated with insurance file audits. In some examples, the preprocessing or the refinement processing of the insurance information includes using artificial intelligence, machine learning, or a combination thereof. In some examples, the insurance information includes text of adjuster documentation. In some examples, the preprocessing of the insurance information outputs organized information. In some examples, the preprocessing of the insurance information outputs queryable information. In some examples, the queryable information is organized in a database. In some examples, the preprocessing of the insurance information outputs searchable information. In some examples, the refinement processing of the preprocessed insurance information includes outputting performance metrics based on the preprocessed insurance information. In some examples, the refinement processing of the preprocessed insurance information includes outputting performance metrics based on the preprocessed insurance information.

Figure 9:
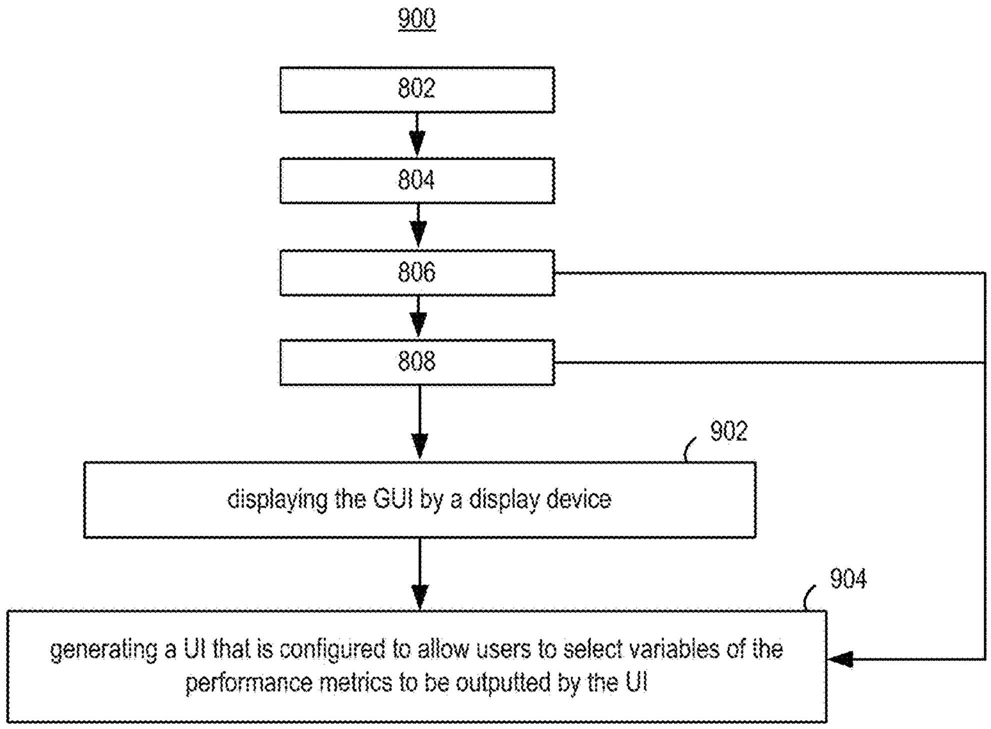

Also, as shown in FIG. 9, method 900 includes the steps of method 800 as well as step 902 that includes displaying the GUI by a display device of the computing system or communicatively coupled to the computing system. Also, the method 900 includes, at step 904, generating, by the computing system, a UI that is configured to allow users of the computing system to select variables of the performance metrics to be outputted by the UI. In some examples, method 900 can be combined with any one or more of the other methods disclosed herein such as method 400, 500, 600, or 700. In some examples, the UI includes a graphical user interface (GUI) configured by the computing system to output the variables of the performance metrics selected by the users. In some examples, the variables include variables related to time to quality contact, time to investigations, time to liability determination, unlisted drivers, drivability assessments, first damage payments, comparative negligence identification, adjuster use of new vendors, claims information to underwriting, or any combination thereof. In some examples, the GUI is selectable by the user to display various levels of granularity or abstraction in the variables of the performance metrics selected by the users. In some examples, the levels include a summary level and the lowest level of granularity. In some examples, the insurance information is received from separate computing systems of separate organizations or entities. In some examples, the separate computing systems include one or more claims information systems, one or more of third-party administrator information systems, or any combination thereof. In some examples, the preprocessing and/or the refinement processing of the insurance information includes using an artificial intelligence engine to read and process the insurance information. In some examples, the artificial intelligence engine includes a model to base the reading or processing of the insurance information. In some examples, the model is a deep-learning model that is trainable through machine learning.

An example benefit of the sentence data refining processes described herein includes flexible data inputs that allow written sentence data from virtually any source to be processed. Another benefit includes the functionality to discern the context of written sentences wherein 'context' discernment includes distinguishing events and activities that happened, did not happen, or may happen. Another benefit includes establishing at a granular level the specific milestones required by an operator.

When industries or organizations create original content documentation, human error and diversity in thought can grossly affect judgment to document facts, circumstances, and decisions. Because every person's judgment is unique and subjective, there are endless ways of documenting information. For this reason and others, there are multiple technical problems that have to be solved to normalize, organize, and measure such information. And, such problems can be resolved at least in part by the sentence data refining processes described herein. Also, there is a need to tie together multiple modules of code, each of which performs different functions, which can be configured or adjusted in real time to a litany of nuances. Such a need can be solved by the snipper and corresponding and related tasks.

Also, the systems described herein can provide a suite of programs that facilitates organizing and loading relevant subject data from a variety of source data contained in either database tables or flat files (e.g., PDF files). Further, the systems described herein can provide knowledge engineering and corresponding libraries that can be used to accumulate, organize, store, and deploy instructions for cleaning and prepping sentence data. Furthermore, the systems described herein can provide a tagging system that applies tags to tokens (e.g., a word, acronym, abbreviation, or misspelled word), punctuation characters, and non-tokens and non-punctuation characters appearing in the sentence data. And, provided is a solution for generating identifier tags from different perspectives, such as a grammatical perspective, a semantical perspective, and a thematical perspective. And, described herein is a solution for a taxonomy system that facilitates creation, population, and usage of taxonomic categories. And, such a system can be used to develop and apply semantic tags. Also, described herein is a value extraction tool that uses tags to identify, extract, and format the information targeted by a user, and an array of functions and processes to organize, analyze, and aggregate the value extractions, along with routines to compare and measure extractions at a grouped level.

The systems described herein can also provide artificial intelligence solutions that are focused on written sentence data and such solutions can provide answers to some problems with large language models (LLMs). For example, using some of the technologies described herein, LLMs can be improved and then applied to populations of specimen documents. Inherent in such processes is the need to use probabilities to fill in the gaps and correct hallucinations. To the end user, this means more time testing and trying to establish the level of inaccuracy. Whereas many of the techniques described herein reduce the need to fill gaps in textual information and correcting sentence data and possible hallucinations.

Another common problem with using computers to identify and extract information from documentation is inconsistent results or output. This problem may be rooted in the use of machine learning being applied to constantly shifting sets of data. A great example of wherein this problem occurs is with CHATGPT. After producing a result, it gives the user the option to regenerate results, which will be different than the initial results usually. Thus, it is not designed or programmed to produce a single result. On the other hand, the techniques described herein can resolve such a technical problem in that they can be designed to produce one result based on the processing of the sentence data. Furthermore, the ability to process a population of data consistently is an important feature of the systems described herein, which can be done via the tasks associated with sub-instructions 302, 304, and 306, for example. Also, many decisions made within an organization are documented in a sentence and a written form. Prior solutions to review those decisions have been limited by the time needed for a person to manually read every document or by the uncertainty created by an AI approach that may or may not have summarized the information coherently. The technologies described herein provide an almost real-time summary and evaluation of the day-to-day decisions being made that are recorded via documentation. Also, for example, documentation produced by AI or machine learning can be summarized, enhanced, or corrected via sub-instructions 302, 304, and 306 as well as the machine learning and model training sub-instructions 312 of instructions 214 of computing system 200.

Figure 10:
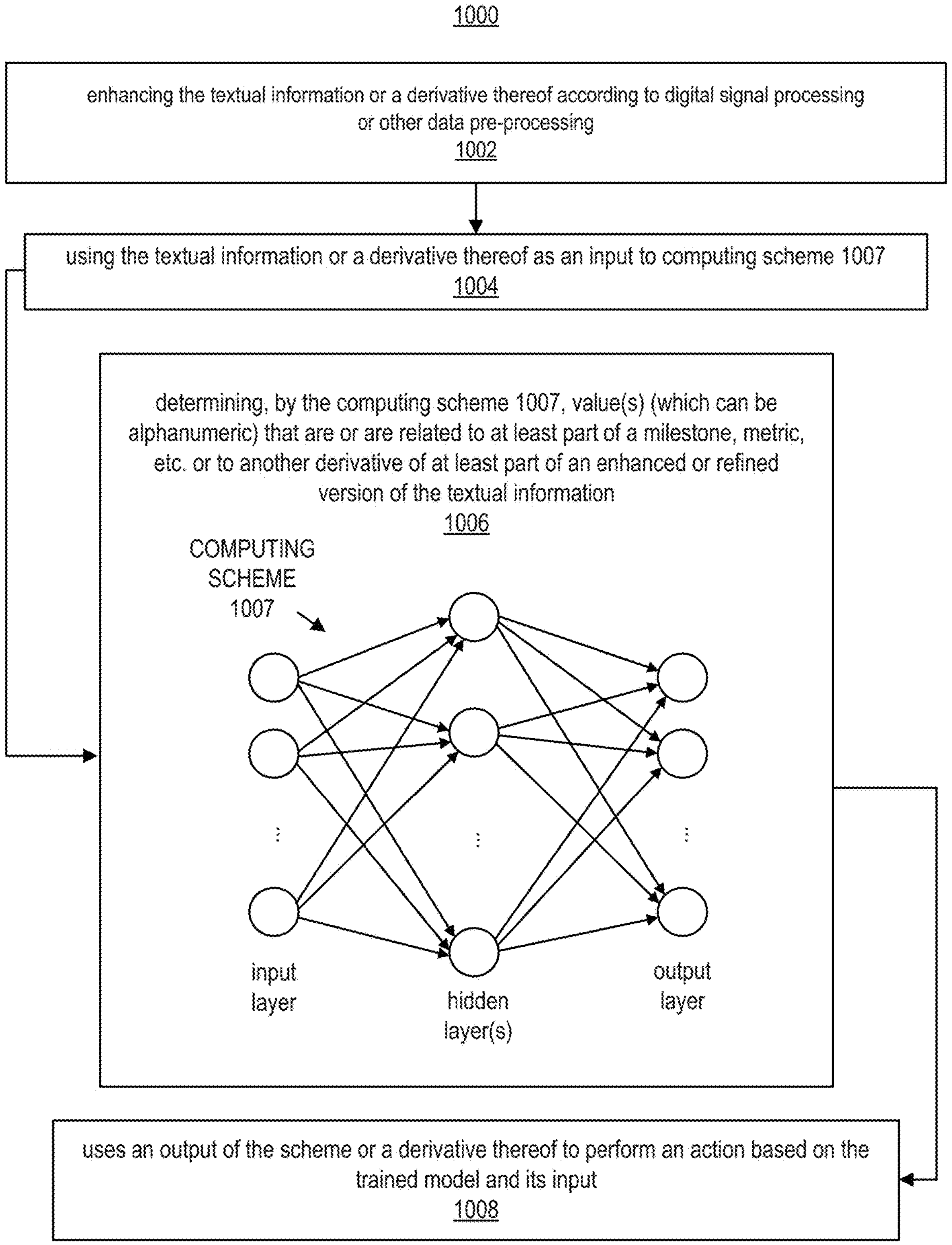

Also, in some embodiments (as shown in FIG. 10), the preprocessing steps, the refinement steps, or the secondary refinement steps described herein (such as the respective steps of respective methods 400 to 900), or a combination thereof, includes the computing system using some form or derivative of the textual information as input for a trained model (e.g., see computing scheme 1007 shown in FIG. 10) to generate an output of the trained model that includes a determination based on the model and the input or further derivation of the textual information, or that includes a precursor of the determination or the further derivation of the textual information (e.g., also see machine learning and model training sub-instructions 312). In some cases, the trained model that outputs the determination based on the model and the input or further derivation of the textual information includes an artificial neural network (e.g., see computing scheme 1007). In some embodiments, the artificial neural network determines at least parts of milestones, metrics, etc., or further derives at least parts of enhanced or refined versions of the textual information. As shown in FIG. 10, a method 1000 includes, at step 1002, the computing system (e.g., see computing system 200) enhancing the textual information or a derivative thereof according to digital signal processing or other data pre-processing. The digital signal processing or other data processing at step 1002 can be a part of the trained model. At step 1004, the computing system uses the textual information or a derivative thereof as an input to the computing scheme 1007. The computing scheme 1007 is a part of the trained model. At step 1006, the computing system specifically determines, by the computing scheme 1007, one or more values (which can be alphanumeric) that are or are related to at least part of a milestone, metric, etc., or another derivative of at least part of an enhanced or refined version of the textual information. And, at step 1008, the computing system uses an output of the scheme or a derivative thereof to perform an action based on the trained model and its inputs. Regarding the computing scheme 1007 or any other computing scheme or trained model described herein, the scheme, in some examples, includes an ANN. And, in some examples, the ANN is part of a deep learning process that determines at least parts of milestones, metrics, etc., or further derives at least parts of enhanced or refined versions of the textual information. (e.g., see steps 1006 and 1008). The deep learning process, in some examples, includes a CNN or a network of convolutional neural networks CNNs.

In some embodiments, one or more of the aforesaid methods can further include integrating, by an integration component of the computing system (e.g., see integration sub-instructions 314 of instructions 214 of computing system 200), the functionality of the one or more methods with online applications, sites, or pages (such as web applications, sites, or pages). The integration can include using one or more user interfaces and application programming interfaces configured to integrate the computing system and its various features and instructions with online applications, sites, or pages. In some embodiments, the integration component can include or be a part of a computer program for web applications or sites such as a program coded in CSS, HTML, JavaScript, or another type of web programming language. The component can be integrated with, in, or through a reference to libraries or other code directly from the source code of a website or application. Also, the integration component can include instructions that do not need to be translated into machine code before it runs.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and functionality presented herein are not inherently related to any particular computer or other apparatus. Various general-purpose systems can be used with programs in accordance with the teachings herein, or it can prove convenient to construct a more specialized apparatus to perform the methods disclosed herein. The structure for a variety of these systems will appear as set forth herein. In addition, the present disclosure is not described with reference to any particular programming language. It will be appreciated that a variety of programming languages can be used to implement the teachings of the disclosure as disclosed herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving or retrieving, by preprocessing instructions of a computing system, original textual information from one or more textual information sources;

preprocessing, by the preprocessing instructions, the original textual information to remove or change abnormal characters and data anomalies in the original textual information;

extracting, by data refining instructions of the computing system, tokens from the preprocessed textual information;

updating, by the data refining instructions, the preprocessed textual information to be organized as a collection of sentences using the tokens, the updating comprising giving each sentence in the collection its own unique ID as well as giving every token extracted a unique extraction ID, wherein each unique extraction ID provides a token offset value (TOV) that identifies the relevance or irrelevance of the extracted information as targeted information, and wherein the TOV is related to distinguishing extracted information as either qualifying for targeted information or disqualified as targeted information depending on a set threshold value for the TOV;

tagging, by the data refining instructions, the updated textual information which comprises tagging items of the updated textual information such as tagging tokens, phrases, punctuation, and sentences of the updated textual information;

extracting, by the data refining instructions, targeted pieces of information from the tagged textual information according to a predetermined extraction task; and generating, by the data refining instructions, evaluative information according to the extracted pieces of information and an evaluation task.

2. The method of claim 1, further comprising normalizing, by the data refining instructions, the tokens prior to the updating of the preprocessed textual information.

3. The method of claim 2, further comprising associating, by the data refining instructions, metadata with the tokens after the normalizing of the tokens.

4. The method of claim 1, further comprising secondary refining, by secondary data refining instructions of the computing system, the targeted pieces of information to organize, analyze, and aggregate the targeted pieces of information into information that is consumable to an end user according to predetermined production instructions.

5. The method of claim 1, wherein the evaluative information comprises milestone, measurements, or metrics related to the extracted pieces of information.

6. The method of claim 1, wherein one or more the textual information sources comprise stored documentation, databases, or a combination thereof.

7. The method of claim 6, wherein the original textual information comprises insurance information.

8. The method of claim 6, wherein the original textual information comprises healthcare information.

9. The method of claim 1, wherein the original textual information is from one or more records, is part of a record, or is part of a file.

10. The method of claim 1, wherein the tokens comprise words, acronyms, and abbreviations.

11. The method of claim 10, further comprising normalizing, by the data refining instructions, the tokens, which comprises performing a series of knowledge engineering tasks.

12. The method of claim 11, wherein the series of knowledge engineering tasks comprises resolving ambiguous tokens.

13. The method of claim 11, wherein the series of knowledge engineering tasks comprises performing series of knowledge engineering tasks that comprise correcting misspelled words, resolving acronyms, resolving abbreviations.

14. The method of claim 11, wherein the series of knowledge engineering tasks comprises creating permanent phrases comprising groups of tokens.

15. The method of claim 11, further comprising storing, by the data refining instructions, outputs of the knowledge engineering tasks in a knowledge library accessible to provide guidance to future knowledge engineering tasks.

16. The method of claim 1, wherein the tagging comprises associating metadata with the tagged items.

17. The method of claim 1, wherein the extraction comprises identifying the targeted pieces of information.

18. The method of claim 17, wherein the extraction comprises normalizing the targeted pieces of information.

19. A method, comprising:

receiving or retrieving, by preprocessing instructions of a computing system, original textual information from one or more textual information sources;

preprocessing, by the preprocessing instructions, the original textual information to remove or change abnormal characters and data anomalies in the original textual information such that the preprocessed information comprises queryable information;

extracting, by data refining instructions of the computing system, tokens from the preprocessed textual information via queries on the queryable information;

updating, by the data refining instructions, the preprocessed textual information to be organized as a collection of sentences using the tokens, the updating comprising giving each sentence in the collection its own unique ID as well as giving every token extracted a unique extraction ID, wherein each unique extraction ID provides a token offset value (TOV) that identifies the relevance or irrelevance of the extracted information as targeted information, and wherein the TOV is related to distinguishing extracted information as either qualifying for targeted information or disqualified as targeted information depending on a set threshold value for the TOV;

tagging, by the data refining instructions, the updated textual information via queries of queryable information within the updated textual information which comprises tagging items of the updated textual information such as tagging tokens, phrases, punctuation, and sentences of the updated textual information;

extracting, by the data refining instructions, targeted pieces of information from the tagged textual information via queries of queryable information within the tagged textual information according to a predetermined extraction task; and generating, by the data refining instructions, evaluative information according to the extracted pieces of information and an evaluation task.

20. A method, comprising:

receiving or retrieving, by preprocessing instructions of a computing system, original textual information from one or more textual information sources;

preprocessing, by the preprocessing instructions, the original textual information to remove or change abnormal characters and data anomalies in the original textual information;

extracting, by data refining instructions of the computing system, tokens from the preprocessed textual information;

updating, by the data refining instructions, the preprocessed textual information to be organized as a collection of sentences using the tokens, the updating comprising giving each sentence in the collection its own unique ID as well as giving every token extracted a unique extraction ID, wherein each unique extraction ID provides a token offset value (TOV) that identifies the relevance or irrelevance of the extracted information as targeted information, and wherein the TOV is related to distinguishing extracted information as either qualifying for targeted information or disqualified as targeted information depending on a set threshold value for the TOV;

tagging, by the data refining instructions, the updated textual information which comprises tagging items of the updated textual information such as tagging tokens, phrases, punctuation, and sentences of the updated textual information;

extracting, by the data refining instructions, targeted pieces of information from the tagged textual information according to a predetermined extraction task; and generating, by the data refining instructions, evaluative information according to the extracted pieces of information and an evaluation task that comprises organizing, analyzing, and aggregating the extracted pieces of information.

* * * * *